(No Model.)
D. M. SCHEFFER.
VETERINARY DENTAL FORCEPS.
No. 426,074. Patented Apr. 22, 1890.
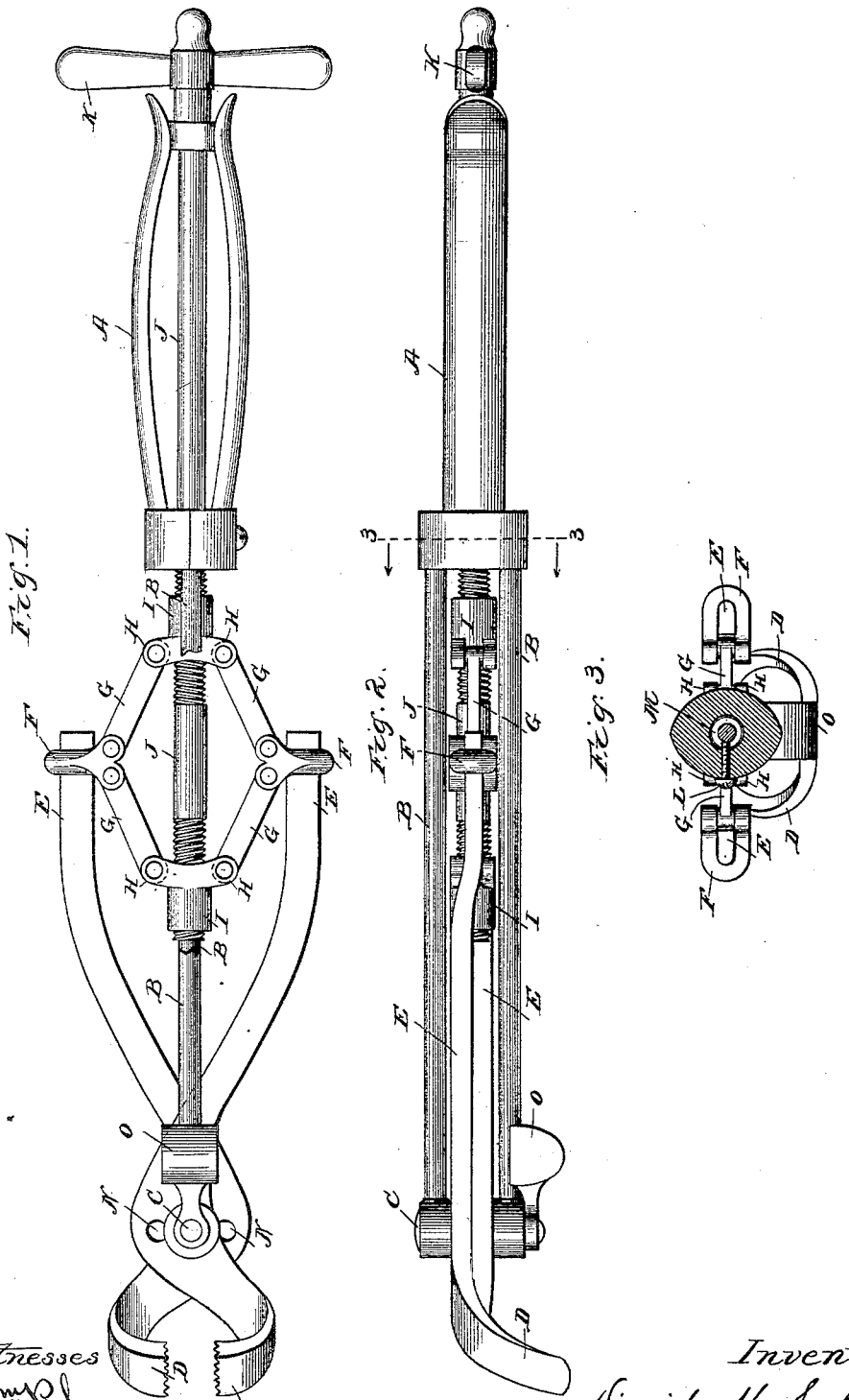
Witnesses
Wm. Rheem
W. R. Quohindro
Inventor
David M. Scheffer
By Jno. G. Elliott
Atty.

UNITED STATES PATENT OFFICE.

DAVID M. SCHEFFER, OF NEW CASTLE, INDIANA, ASSIGNOR TO HAUSMANN, McCOMB & DUNN, OF CHICAGO, ILLINOIS.

VETERINARY DENTAL FORCEPS.

SPECIFICATION forming part of Letters Patent No. 426,074, dated April 22, 1890.

Application filed July 26, 1888. Serial No. 281,129. (No model.)

*To all whom it may concern:*

Be it known that I, DAVID M. SCHEFFER, a citizen of the United States, and a resident of New Castle, in the county of Henry and State of Indiana, have invented certain new and useful Improvements in Veterinary Dental Forceps, of which the following is a specification.

This invention relates to improvements in veterinary dental forceps, in which heretofore the grip of the forceps upon a tooth has been dependent solely upon the muscular power of the operator, regulated by the length of the handles thereof, giving greater or less leverage and requiring the constant exercise of the entire strength of the operator in order to maintain a grip upon the tooth. With such devices also the operator must depend upon his strength only for sufficient power to extract the tooth, and for this reason it is frequently impossible for an operator to draw a tooth, because of the great strength required, even in the extraction of objectionable teeth, besides which the operation is rendered very laborious and dangerous to the animal being operated upon by the necessary violence of the twists and pulls of the operator in his efforts to extract the tooth.

The prime object of this invention is to enable the gripping of a tooth with any desired power, and which power shall be constant in its nature and sustained without any further exertion of the operator after once being fixed.

Another object is to enable the extraction of a tooth by leverage gained by fulcruming the forceps upon the teeth adjacent to that upon which the forceps have been fixed, whereby the power ordinarily required for extracting a tooth is materially lessened and the operator enabled to first twist the tooth in its seat, so as to loosen the same, and then employ the forceps as a lever for extracting the tooth without detachment therefrom.

A further object is to have the gripping-jaws of the forceps adjustable in such manner as to be adapted for use upon teeth varying in size and to have the forceps so constructed that any desired power may be exerted by the gripping-jaws and at the expense of little power on the part of the operator, and which jaws will remain in whatever position they are set without further exertion or control by the operator.

I attain these objects by the devices illustrated in the drawings, in which—

Figure 1 represents an inverted plan view of a pair of forceps embodying my invention, showing a portion of the frame broken away to more clearly illustrate the operation of the device; Fig. 2, a side elevation thereof; and Fig. 3, a transverse vertical section on the line 3 3 of Fig. 2, looking in the direction indicated by the arrows.

Similar letters of reference indicate the same parts in the several figures of the drawings.

Referring by letter to the accompanying drawings, A indicates the handle; B B, rods secured thereto above and below the center thereof and extending forwardly therefrom a suitable distance in a parallel line, the outer ends of which rods are connected by a bolt C, which also constitutes the pivots of the jaws D, the shanks of which lie between the said rods, while the handle ends thereof project rearwardly, diverging from the pivot, as is usual in this class of devices.

To the ends of the jaw-handles E are rigidly secured U-shaped clips F, to each of which is pivotally connected a pair of links G, diverging from each other, the opposite ends of which links are pivotally connected lugs or ears H, projecting from screw-threaded sleeves I, mounted and working upon a right and left screw-threaded rod J, which journals axially in the handle A, projecting forwardly between the rods B B in a parallel plane therewith. The said rod J projects entirely through the handle and has rigidly secured upon the opposite rear end thereof a handle K, by means of which the rod may be rotated in its bearings in the handle, being prevented from having a longitudinal movement therein by means of a screw L, passing through the handle A, the end of which projects into an annular groove M in said rod, although the same end might be accomplished by means of collars upon said rod or in any other well-known and convenient manner.

The double-link connection between the screw-threaded sleeves on the rod J and the handles E of the gripping-jaws constitutes a toggle-joint between said members, by means of which power may be applied to the gripping-jaws, so as to cause them to approach and recede from each other, the forceps being held in one hand by the handle A and operated with the other hand by means of the handle K, which causes the rod J to rotate and the sleeves I to approach and recede from each other, thereby producing a corresponding movement of the handles E and the gripping-jaws. These gripping-jaws are made adjustable by means of perforations N in the shanks thereof, through which the bolt C is passed, thus enabling the jaws to be set for gripping teeth of various sizes. It will also be observed that the gripping-jaws D are serrated or toothed on their operating-faces and are curved or bent downwardly to a plane below their supporting-frame for greater convenience of attachment to a tooth.

On the under side of the supporting-frame, and preferably secured in position by means of the bolt C, is a projection O, bearing upon the supporting-frame, or rather the under rod B thereof, which projection is designed as a fulcrum for the forceps to rest upon, so as to facilitate the extraction of the tooth and to render the operation less laborious, which projection may be of metal and provided with a yielding face of any character; or the entire projection may be composed of some elastic or yielding material—such as vulcanized rubber—so as to obviate the danger of fracture to the teeth upon which it rests as a fulcrum.

In the practical use of these forceps the jaws are first adjusted to the size of the tooth which it is desired to extract, and when fitted in position the handle K is operated until the tooth is firmly gripped by the jaws, when the forceps are reciprocated horizontally a few times until the tooth is loosened in the socket, after which the handle is brought down until the fulcrum O rests upon the adjacent teeth, when the forceps may be used as a lever to forcibly extract the tooth upon which the jaws have been fastened.

With forceps constructed as herein shown and described it is obvious that the operator will not only be relieved of the usual strain necessary for extracting teeth, but the animal being operated upon will also be relieved of the danger resulting from violent jerks and pulls, besides which the tooth to be extracted may be firmly gripped and held by the forceps under a constant power without any further exertion upon the part of the operator after the jaws have been caused to grip the tooth.

Having described my invention, what I claim, and desire to secure by Letters Patent, is—

1. In veterinary dental forceps, the opposing gripping-jaws, a pivotal support therefor, and the handles thereof, in combination with a screw-threaded rod journaled in said support and a toggle-connection between said rod and jaw-handles, whereby the said jaws may be caused to approach and recede from each other, substantially as described.

2. In veterinary dental forceps, the opposing gripping-jaws, a pivotal support therefor, and the handle ends thereof, in combination with a screw-rod journaled in said support, a screw-threaded sleeve mounted on said rod, and links connecting said sleeve with both of said jaw-handles, substantially as described.

3. In veterinary dental forceps, the opposing gripping-jaws, a pivotal support therefor, and the handle ends thereof, in combination with a right and left screw-threaded rod journaled in said handle, screw-threaded sleeves mounted on said rod, and links connecting said sleeves, respectively, with each of said jaw-handles, substantially as described.

4. In a veterinary dental forceps, the opposing gripping-jaws, a pivotal support therefor, and the handles thereof, in combination with a screw-threaded rod journaled in said support, a toggle-connection between said rod and jaw-handles, and a fulcruming projection on said support, substantially as described.

DAVID M. SCHEFFER.

Witnesses:
J. C. BOONE,
SALLIE E. COTTON.